Feb. 13, 1934.  D. B. BAKER  1,946,660
TOP TRACK SUPPORT FOR TRACK TYPE TRACTORS
Filed Jan. 24, 1933
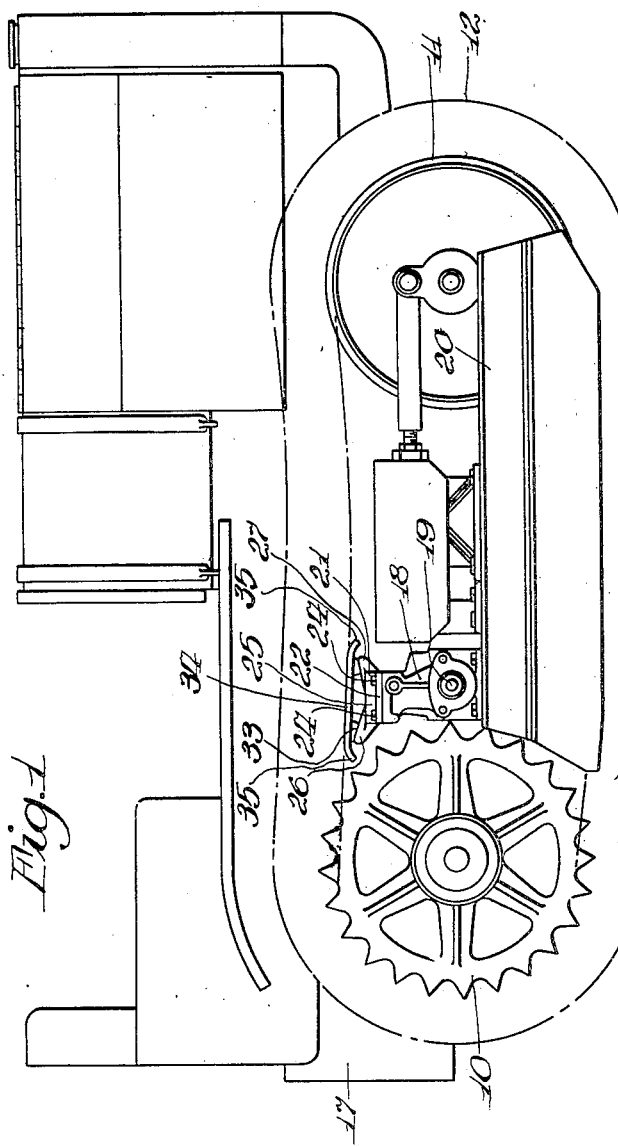

Patented Feb. 13, 1934

1,946,660

UNITED STATES PATENT OFFICE 1,946,660

TOP TRACK SUPPORT FOR TRACK TYPE TRACTORS

David B. Baker, Riverside, Ill., assignor to International Harvester Company, a corporation of New Jersey Application January 24, 1933. Serial No. 653,300

6 Claims. (Cl. 305—9)

This invention relates to improvements in track type tractors.

In this type tractor, a support of some kind, usually a roller or slide, is provided to support the upper run of the endless track at a point immediately in front of the rearwardly positioned driving sprocket wheel which actuates the track.

More particularly this invention relates to an improved form of slide type track support for the upper run of the track.

The object of the invention is to provide an improved form of slide support for carrying the upper run of the track.

Another object is to provide a particular mount for this slide, so that, should the slide become worn out, it can very easily be replaced.

Other objects will be apparent to those skilled in this art as the description continues.

Briefly, these desirable objects may be achieved by the practicable form of the invention chosen for illustration in the drawing in which form a particular form of slide is provided which is detachably mounted in a simple manner on a support bracket as will later more fully appear.

In the sheet of drawings:

Figure 1 is a general side elevational view of a track type tractor showing the improved track support for the upper run of the track;

Figure 2 is a front elevational view of the track supporting structure, the side truck, and the track links appearing in section;

Figure 3 is a longitudinal, cross sectional view taken along the line 3—3 appearing in Figure 5 through the assembly of the support and the slide;

Figure 4 is a transverse cross sectional view through the same assembly as viewed along the section line 4—4 appearing in Figure 3; and, Figure 5 is a top plan view of the assembled support and slide.

The tractor shown is of a well known type embodying in each endless track unit, of which there are two arranged one on each side, a driving sprocket wheel 10 and a front idler wheel 11, around which is trained the endless track belt 12 which, as shown in Figure 2, comprises spaced apart side links 13 articulately connected by hinge pins 14 and bushings 15. The side links 13 are spaced apart in substantially parallel relation as is common in this art, and they are connected together by shoes 16 bolted thereto, as shown in Figure 2.

The body of the tractor appears at 17, the same carrying a side bracket 18 in which is arranged a trunnion 19 for pivotally hanging the usual roller side truck 20 resting on the ground run of the track 12.

In practice it is found desirable to provide a support for the upper or top run of the endless track 12 at a point immediately forwardly of the driving sprocket wheel 10.

This invention provides such a support, which preferably assumes the form of a casting 21, said support comprising a transversely extending portion providing wings or ears 22 having a hole 23 in each corner thereof, the support being rectangularly shaped, and the holes 23 receiving bolts 24 for securing the support rigidly to the bracket 18.

As shown in Figure 4, these wings 22 slope upwardly to merge with a raised fore and aft extending elongated rest portion 25, said portion 25 extending rearwardly to project ahead of the wings 22 to provide a seat 26, and similarly projecting forwardly of the ears or wings 22 to provide a similar seat 27. The seat 26 is disposed somewhat higher than the seat 27, so that the two are arranged with respect to one another along an inclined line, as shown in Figure 3, said seats, respectively, being bounded by a raised flange 28 and 29 to form pockets. These pockets are provided with holes to receive bolts 30 carrying nuts 31 above the pockets to receive the claws 32 of depending bosses 33 formed at the ends and on the under side of a slide 34, the ends of which are curved downwardly, as at 35, in the fashion of a runner.

In use, the slide 34 is secured by the bolts 30 to the pockets in the support 21 bounded by the flanges 28 and 29, as shown in Figure 3. The bolts 30 engage the claws 32 and then, by drawing the nuts 31 down tightly, the bosses 33 are secured in place in said pockets on the support casting 21. The bosses 33 are of sufficient height to permit access to the nuts 31 for drawing them tight, and the head of the bolts 30 can be engaged by a wrench during the tightening of the nuts 31, because they are also accessible, as the front and rear ends of the bracket 21 are raised, due to the inclined construction 22.

Should the slide 34 wear out, it can very easily be replaced because of the simple bolted connections described for mounting the same on the support 21.

Further, it is to be noted that the slide 34 in practice receives the bushings 15 of the track chain between the spaced, parallel side links of the track belt, as shown in Figure 2, thus helping to guide the track belt as it comes off the sprocket wheel 10 along its upper run.

From this disclosure it must now be apparent that a simple and improved form of slide and support has been provided for the upper run of the track, and that the same is inexpensive and fool proof, and capable of easy and quick replacement.

It is the intention herein to cover all such changes and modifications of the example of the invention shown which do not depart from the spirit and scope of the invention as indicated in the appended claims.

What is claimed is:

1. Means for supporting the upper run of a track for a tractor having a bracket located between the runs of the track, said means comprising a support secured to the bracket and formed with spaced pockets arranged in longitudinal alignment, and a slide having bosses adjacent its ends secured in said pockets, said slide supporting the upper run of the track.

2. Means for supporting the upper run of a track for a tractor having a bracket located between the runs of the track, said means comprising a support secured to the bracket and formed with spaced pockets arranged in longitudinal alignment and inclined with respect to one another along a longitudinal line, and a slide having bosses adjacent its ends bolted in said pockets, said slide being inclined as the result of said mounting and supporting the upper run of the track.

3. Means for supporting the upper run of a track for a tractor having a bracket located between the runs of the track, said means comprising a support secured to the bracket and formed with spaced pockets arranged in longitudinal alignment and a slide having bosses extending from its under side adjacent its ends, said bosses terminating in claws which seat in the respective pockets, a bolt passed through each pocket and claw, and a nut on each bolt to secure the claws to the pockets of the support.

4. Means for supporting the upper run of a track for a tractor having a bracket located between the runs of the track, said means comprising a support having transversely arranged side wings bolted to the bracket, said support including front and rear extensions longitudinally aligned to form seats, bolts in the seats, and a longitudinally disposed slide having bosses seating in the seats and secured thereto by said bolts.

5. Means for supporting the upper run of a track for a tractor having a bracket located between the runs of the track, said means comprising a support having transversely arranged side wings bolted to the bracket, said wings being inclined upwardly to merge in raised front and rear extensions to form seats, a longitudinally disposed slide having bosses resting on said seats, and means detachably securing the bosses in said seats.

6. Means for supporting the upper run of a track for a tractor having a bracket located between the runs of the track, said means comprising a support having transversely arranged side wings bolted to the bracket, said wings being inclined upwardly to merge in raised front and rear extensions to form seats, a longitudinally disposed slide having claw shaped bosses adjacent its ends resting on said seats, bolts passed through the seats and claws, and nuts on the bolts to secure the bosses to the seats.

DAVID B. BAKER.